March 31, 1970 J. V. DEREGNAUCOURT 3,504,287

CIRCUITS FOR STUFFING SYNCH, FILL AND DEVIATION WORDS TO ENSURE DATA LINK OPERATION AT DESIGNED BIT RATE

Filed May 8, 1967 2 Sheets-Sheet 1

March 31, 1970 J. V. DEREGNAUCOURT 3,504,287

CIRCUITS FOR STUFFING SYNCH, FILL AND DEVIATION WORDS TO ENSURE DATA LINK OPERATION AT DESIGNED BIT RATE

Filed May 8, 1967 2 Sheets-Sheet 2

United States Patent Office 3,504,287

Patented Mar. 31, 1970

3,504,287

CIRCUITS FOR STUFFING SYNCH, FILL AND DEVIATION WORDS TO ENSURE DATA LINK OPERATION AT DESIGNED BIT RATE

Jacques V. Deregnaucourt, Ottawa, Ontario, Canada, assignor to Northern Electric Company Limited, Montreal, Quebec, Canada Filed May 8, 1967, Ser. No. 636,741
Claims priority, application Canada, Oct. 28, 1966, 974,312
Int. Cl. H04b *1/00, 7/00*
U.S. Cl. 325—38 4 Claims

ABSTRACT OF THE DISCLOSURE

A system for transmitting data at a first bit rate on a data link having a second bit rate is disclosed in which a synchronization word, a deviation word, and a fill word are added to each block of data from the data source prior to transmission. The synchronization word, deviation word and fill word are then extracted at the receiver before the data is transmitted.

Figure 1:
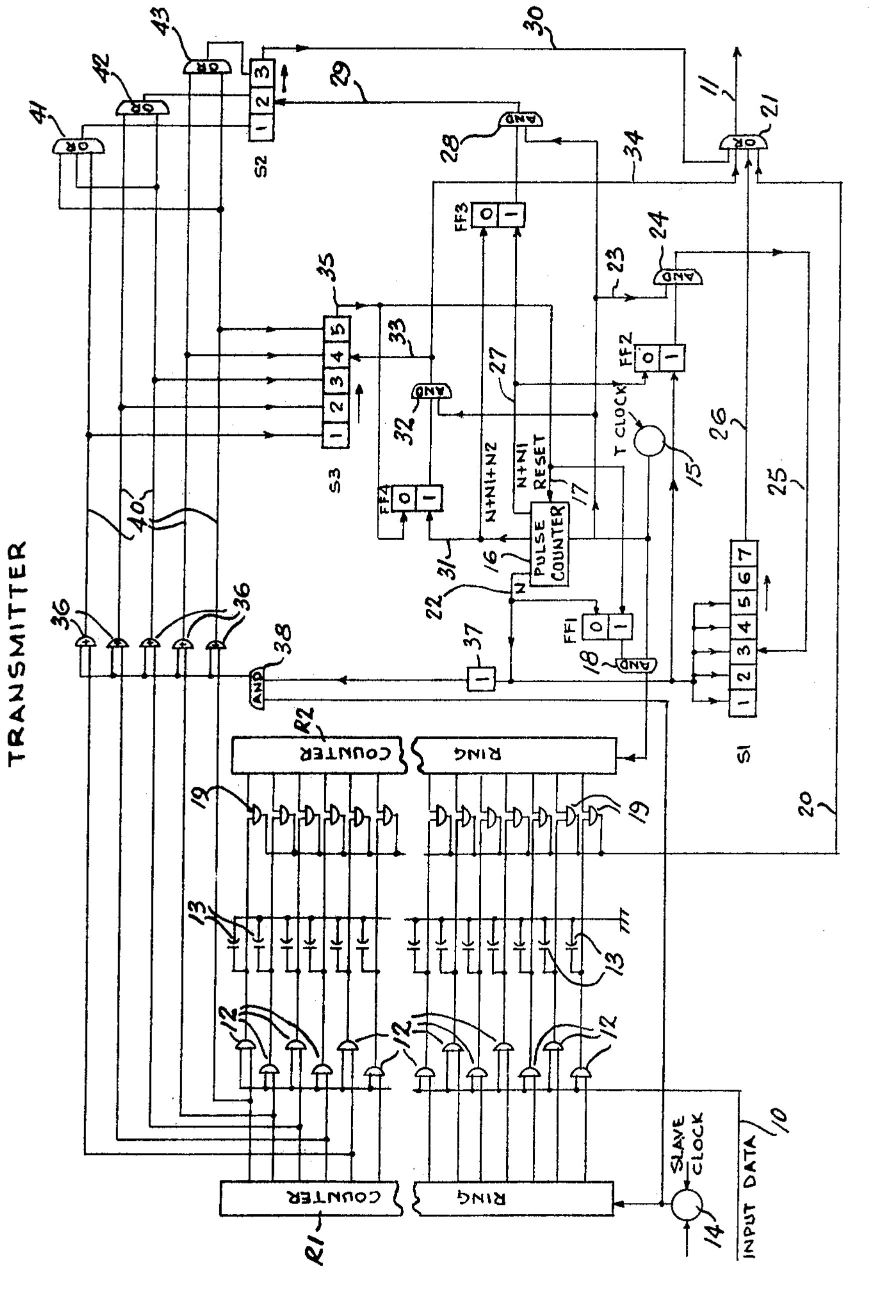

The present invention relates to the field of data transmission and in particular relates to the transmission of pulse coded data originating at a data source of a given bit rate, on a data link having a higher bit rate. There need be no simple numerical relationship between the bit rate of the data source and the bit rate of the data link, the sole limitation being that the data transmission rate or bit rate of the data link is significantly higher than the bit rate of the data source; that is about 1 or 2% higher than the maximum frequency, or bit rate of the data source. From the following description, it will be appreciated that the present invention is particularly useful where there is no constant difference in bit rates between the data source and the data link, and it is necessary to compensate for changes in the difference between the two bit rates.

In the field of pulse code modulation telephone communication there is a requirement to transmit multiplex PCM telephone conversations over data links having frequencies or bit rates higher than the bit rate of the originating source of the PCM data. In order to accomplish this in accordance with known devices, pulses have been added randomly to the pulse stream from the PCM data source, and these random pulses have been removed at the receiving end of the system by various techniques.

These known systems which are referred to as systems for "pulse stuffing," add these pulses randomly throughout the PCM data, and accordingly the "stuffed" pulses are inserted in the train of data pulses and can give rise to noise and synchronization problems.

The present invention provides a system for transmitting data from a source of data at a first bit rate, on a data link having a second higher bit rate, in which the data is fed into a memory at the first bit rate and from the memory onto the data link at the second bit rate. At the beginning or end of each discrete block of data from the data source, additional information is transmitted on the data link consisting of a synchronization word, a deviation word and a fill word. The synchronization word is provided for the purpose of maintaining synchronism between the data source and the ultimate receiving equipment, the deviation word is a numerical analogue of the number of bits in the fill word which contains the necessary number of bits to ensure that the data link is operated at its designed bit rate. Thus a transmission of a discrete block of data from the data source on the data link consists of the block of data, the synchronization word, the deviation word, and the fill word, all of which are transmitted at a higher bit rate of the data link. At the receiving end of the data link, means are provided to recognize the synchronization word, and to feed the block of data from the data source into a memory and to inhibit reading the synchronization word, the deviation word, and the fill word into this memory, read out from the memory at the receiver being at the original bit rate of the original data source with synchronizing information provided by the synchronization word.

Figure 2:
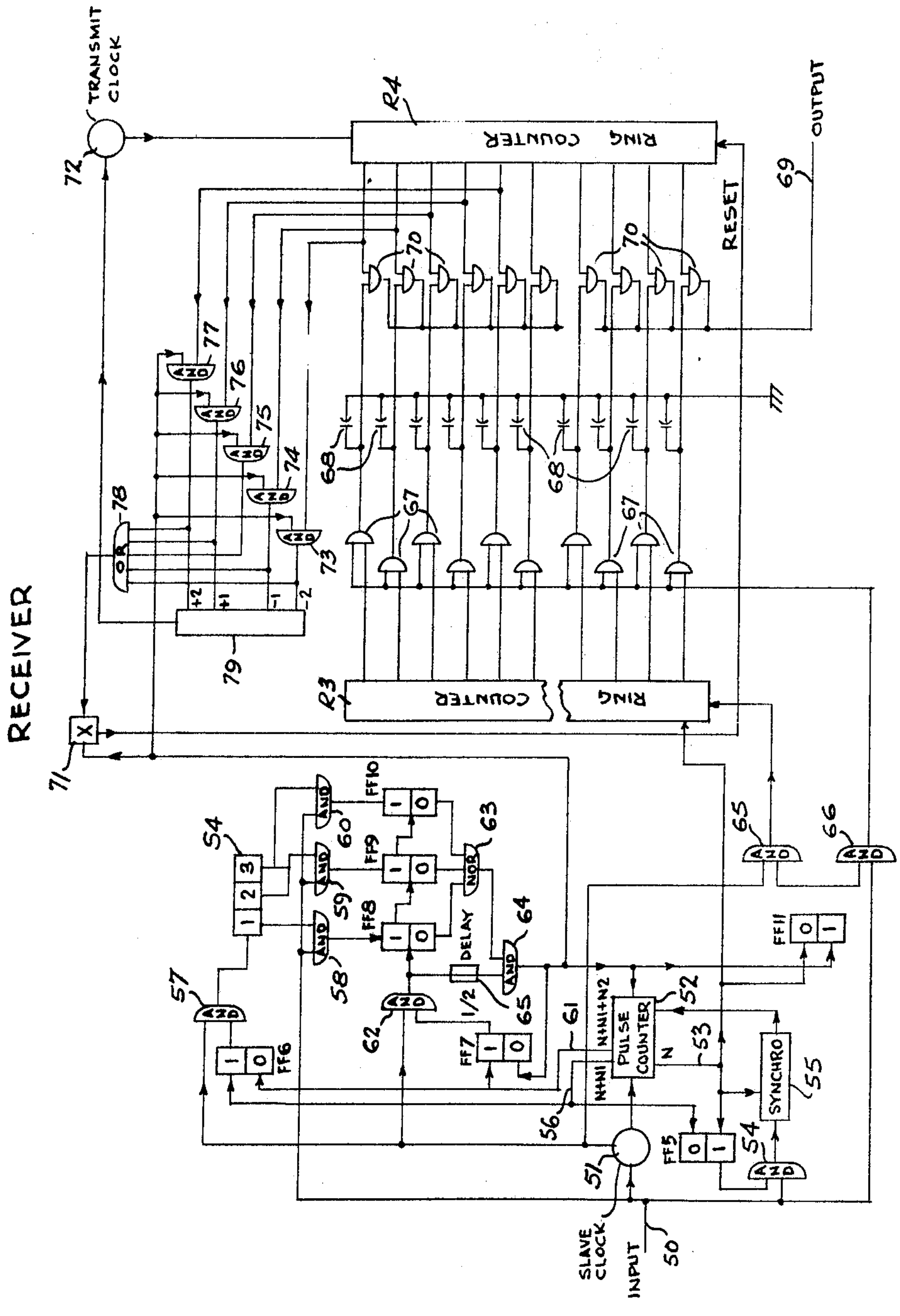

In order to illustrate the present invention, the structure and operation of a typical data transmitter and receiver constructed in accordance with the present invention will be described in relation to the drawings in which:

FIGURE 1 is a schematic block diagram of a data transmitter constructed in accordance with the present invention, and FIGURE 2 is a schematic block diagram of a data receiver constructed in accordance with the present invention.

Referring to FIGURE 1, there is illustrated a transmitter constructed in accordance with the present invention which is fed input data on the line 10 from a source of input data such as T1 PCM multiplex telephone system containing up to 24 one-way telephone channels. The incoming data is arriving at an instantaneous pulse repetition rate or bit rate $F_{in}$ which may vary between the lower limit $F_1$ and an upper limit of $F_2$. Outgoing data from the transmitter is fed to a data link on line 11, with an outgoing pulse repetition rate or bit rate of $F_{out}$ which is the design bit rate or frequency of operation of the transmission data link. The incoming data on line 10 is grouped into groups of N digits and the outgoing data at the output of the receiver will accordingly be restored to groups of N digits. There is no physical limitation to the length of these groups of N digits however when the incoming data is already organized into groups of N digits, the synchronization and other data added to the incoming data before it is transmitted on the data link can be added between incoming data words to fill up the time slots on the data link. In accordance with the present invention, a synchronization word consisting of $N_1$ bits is added at the end of a data word from the data source and serves to identify the end of a data word to the receiving equipment. The synchronization word may be as short as one bit.

In accordance with the invention a deviation word is added after the synchronization word, the deviation word consisting of $N_2$ bits which are a binary number representing the number of digits in the fill word. The fill word consists of $N_3$ digits where $N_3$ is a variable number and is the number of pulses added to the data word, the synchronization word and the deviation word to fill up all the available time slots on the data link.

The input data from line 10 is fed via the AND gates 12 to the capacitor memory 13. The opening of the AND gates 12 is controlled by a slave clock 14 which drives a ring counter R1, the slave clock 14 being synchronized with the input data on line 10. A transmitting clock 15 is provided operating at the frequency $F_{out}$ which controls the operation of the remainder of the transmitting equipment. The output of the clock 15 consists of a string of pulses at the frequency $F_{out}$. These pulses are used to drive a pulse counter 16, and the three shift registers, $S_1$ which generates the synchronization word, $S_2$ which generates the deviation word and $S_3$ which generates the reset impulse. The clock 15 also drives the ring counter $R_2$ which reads out of the memory at the bit rate $F_{out}$.

The pulse counter 16 is reset to 0 by a reset pulse from the shift register $S_3$, fed to the pulse counter on line 17, labelled RESET. There are three outputs from the pulse counter 16, the first output occurs N pulses after the counter 16 has been reset, the second output is generated $N+N_1$ pulses after the counter 16 has been reset, and the third output is generated $N+N_1+N_2$ pulses after the counter has been reset. The input to the pulse counter 16 consists of clock pulses from the clock 15. The three outputs from the pulse counter 16 and the reset pulse from the shift register $S_3$ are used to switch the stream of pulses from the clock 15 to four different sections in sequence. When the reset pulse is generated by the shift register $S_3$, the flip flop $FF_1$ is turned on and in turn opens the AND gate 18 which allows clock pulses from the clock 15 to drive the ring counter $R_2$ to control the readout of the data stored in the storage capacitors 13. The ring counter $R_2$ serves to open the AND gates 19 in the proper sequence so that the pulses from the storage capacitors 13 can be fed on the line 20 to the OR gate 21 whence they are fed to the data link on line 11. N pulses after the pulse counter 16 has been reset an output is provided on line 22 which turns flip flop $FF_1$ off, closing AND gate 18, and turns flip flop $FF_2$ on. Pulses from the clock 15 are then fed via line 23 to the AND gate 24 to drive the shift register $S_1$ via line 25. Register $S_1$ is also driven via line 22 by the pulse counter 16. Thus the shaft register is conditioned to generate the synchronization code which is transmitted on line 26 to the OR gate 21 and from the OR gate 21 to the output 11. In FIGURE 1 the setting of the shift register $S_1$ may be obtained by connecting different sections to a multi-input OR gate (not illustrated) when the binary digit 1 is to be sent or not connecting the section when a 0 is to be transmitted.

$N+N_1$ pulses after being reset, the pulse counter 16 generates an output on line 27. This output on line 27 turns off flip flop $FF_2$ and turns on flip flop $FF_3$ which opens AND gate 28 permitting timing pulses from the clock 15 to be fed to the deviation word shift register $S_2$ on the line 29. The generation of the deviation word by the shift register $S_2$ will be discussed in detail below. The output from the shift register $S_2$ is fed on line 30 to the OR gate 21 and is transmitted through the OR gate 21 to the output 11.

When the last digit of the deviation word from the shift register $S_2$ has been transmitted to the output 11, the pulse counter 16 will have counted $N+N_1+N_2$ pulses, and an output will appear on line 31 which turns off the flip flop $FF_3$, and turns on flip flop $FF_4$. Flip flop $FF_4$ opens the AND gate 32 permitting clock pulses from the clock 15 to be fed to the shift register $S_3$ on line 33. The clock pulses from the clock 15 are also fed through AND gate 32 on line 34 to the OR gate 21 and to the output 11. These pulses constitute the fill word which consists of the necessary bits to fill up the available time slots required in the output to the data link. Flip flop $FF_4$ is turned off by the output from the shift register $S_3$ on line 35. The output on the line 35 constitutes the reset pulse which is supplied on line 17 to reset the pulse counter 16 and to turn on the flip flop $FF_1$ to open the AND gate 18 to commence a new cycle of memory read out from the storage capacitors 13.

Consideration will now be given to the generation of the reset pulse by the shift register $S_3$ and the generation of the deviation word by the shift register $S_2$. At the time that the $N^{th}$ pulse is counted by the pulse counter 16, and an output is present on line 22 the ring counter $R_1$ is in one of its last $N_3$ states. That is there is a ONE bit present at the input of one of the $N_3$ AND gates 36. Please note that in the drawing of FIGURE 1 the maximum value of the digit $N_3$ is 5. This is an arbitrary figure that would depend on the design of the particular system. It is possible that the slave clock 14 and the transmitter clock 15 will not be operating exactly in phase, and accordingly the output on line 22 could occur at a time when the ring counter $R_1$ is changing from one state to another. To avoid this unfavourable situation, the pulse on line 22 is fed through a pulse stretcher 37 to an AND gate 38 which is strobed by a pulse generated by the slave clock 14 in phase opposition with the pulse supplied by the slave clock 14 to drive the ring counter $R_1$. The output of the AND circuit 38 is then fed via line 39 to the AND gates 36 to provide an output on one of the lines 40 to condition the shift register $S_3$. This output on one of the lines 40 is also fed to the three OR gates 41, 42 and 43 which serve as a binary translator to condition the shift register $S_2$ to generate the deviation word. In the circuit illustrated in FIGURE 1, the maximum number of bits in the fill word is five. Accordingly the shift register $S_3$ which generates the fill word has five sections. Thus a maximum of five pulses will be fed from the clock 15 through the AND gate 32 to the OR gate 21 to the output line 11, before an output on line 35 (the reset pulse) is generated by the shift register $S_3$. The actual number of fill pulses transmitted will of course depend on which section of the shift register $S_3$ is conditioned by the output on the lines 40.

The OR gates 41, 42 and 43 together with the shift register $S_2$ constitute a translator for generating a binary number indicating the number of bits $N_3$ in the fill word. Since in FIGURE 1 the maximum number of bits in the fill word is five and the binary equivalent of five is 101 three stages are provided in the shift register $S_2$ for generating the deviation word.

Assume that the ring counter $R_1$ is at its fifth last stage when the AND gates 36 are opened. An output will be present on the uppermost line 40 which conditions section 1 of the shift register $S_3$ and is simultaneously fed to the OR gate 41. The OR gate 41 conditions the shift register $S_2$ to generate the binary code 100 on line 30 which is binary one transmitted least significant digit first. Similarly if the ring counter $R_1$ is at its last stage the fifth stage of the shift register $S_3$ will be conditioned, and the shift register $S_2$ will be conditioned to generate the output 101 on line 30, which again is binary five transmitted least significant digit first. Thus the deviation word is generated by the shift register $S_2$ in accordance with the length of the fill word generated by the shift register $S_3$.

FIGURE 2 illustrates the equipment at the receiving end of the data link for restoring the data to the original condition that it was in when it was transmitted on line 10 to the transmitter. Data from the data link at the frequency $F_{out}$ is received on line 50 and serves to feed various control and synchronization circuits for the purpose of extracting the synchronization word, the deviation, and the fill word before the data is fed to a temporary memory. Input data at the line 50 drives a slave clock 51 which drives a pulse counter 52 whose operation is analogous to the pulse counter 16 of FIGURE 1. N clock pulses after the pulse counted 52 has been reset, an output is produced on line 53 which turns on flip flop $FF_5$ which opens AND gate 54 permitting the input pulse train at line 50 ot be fed to the synchro receiver 55. At the end of a synchronization word, the pulse counter will have counted $N+N_1$ pulses and an output will appear at line 56 of the pulse counter 52 which turns off the flip flop $FF_5$, closes the AND gate 54, and prevents further pulses from being fed to the synchro receiver 55. At the same time the output on line 56 turns on flip flop $FF_6$, which opens AND gate 57 permitting clock pulses to be fed to the shift register $S_4$. At the same time the deviation word is appearing at input 50 and is coupled via AND gates 58, 59 and 60 to flip flops $FF_8$, $FF_9$ and $FF_{10}$. At the end of the deviation word, the pulse counter 52 will have counted $N+N_1+N_2$ pulses and an output will apear on line 61 which will turn off flip flop $FF_6$ and turn on flip flop $FF_7$ which will open AND gate 62 permitting clock pulses from slave clock 51 to be fed to the flip flops $FF_8$, $FF_9$, and $FF_{10}$ which count down and provide an output through NOR gate 63 to drive the AND gate 64. When these flip flops have counted down to 0, one pulse from the slave clock 51 delayed by a half time slot in the delay circuit 65 is also fed to AND gate 64 and the output of AND gate 64 turns on flip flop $FF_{11}$, turns off flip flop $FF_7$, and resets the pulse counter 52 to 0. Flip flop $FF_{11}$ turns on AND gates 65 and 66 and clock pulses from the slave clock 51 are fed via AND gate 65 to drive the ring counter $R_3$ which operates in a fashion analogous to the ring counter $R_1$ of FIGURE 1. Similarly AND gate 66 passes input pulses from the input line 50 to the AND gates 67 of the memory unit where the input data is stored on the storage capacitors 68. The data train from the storage capacitors 68 is read out into the outgoing data line 69 via a ring counter $R_4$ which drives a series of AND gates 70. In order to read the data out of the memory properly, the ring counter $R_4$ must be properly synchronized to the input data.

It will be appreciated that the ring counter $R_4$ of FIGURE 2 must remain synchronized with the ring counter $R_1$ of FIGURE 1 since these two counters are operating at the rate of the incoming data $F_{in}$. Similarly the ring counters $R_2$ and $R_3$ must remain in synchronism at the rate of the data link $F_{out}$. The circuitry to maintain syncronism is described in detail hereinafter.

The synchronization is achieved as follows. When the receiving pulse counter 52 reaches the count N, the ring counter $R_3$ should be in its 0 state (assuming that N is a multiple of the number of stages in the ring counter $R_3$). The ring counter remains in this state until flip flop $FF_{11}$ is turned off again, and accordingly any resetting pulse which occurs during this time interval will resynchronize the ring counter $R_3$. In contrast the ring counter $R_4$ does not have any non-energized period, but is continuously scanning the storage capacitors 68 to feed the output data to the output 69. However, at the time when the pulse counter 52 is reset to 0, the ring counter $R_4$ should be in one of its last $N_3$ states. Apparatus is provided to check this by feeding the reset pulse from AND gate 64 to EXCLUSIVE OR gate 71, the output of which may reset the ring counter $R_4$. The reset pulse from AND gate 64 is fed to the AND gates 73, 74, 75, 76 and 77. If the ring counter $R_4$ is in one of its last $N_3$ states, the reset pulse from AND gate 64 will open the AND gates 73, 74, 75, 76 and 77 to pass a pulse to the OR gate 78 which is fed to the EXCLUSIVE OR gate 71, and no output will be obtained from the EXCLUSIVE OR gate 71. If the ring counter is not in one of its last $N_3$ states then the OR gate 78 will not provide an output to the EXCLUSIVE OR gate 71 in coincidence with the reset pulse from AND gate 64 and the gate 71 will provide an output to reset the ring counter $R_4$.

The output from the AND gates 73, 74, 75, 76 and 77 is also fed to the digital to analog converter 79 which controls the rate of the transmit clock 72 which in turn controls the operation of the ring counter $R_4$. It will be noted from FIGURE 2 that the output of the AND gate 75 is not connected to the digital to analog converter 79 since an output from AND gate 75 indicates that the transmit clock 72 is operating at the intended frequency. Outputs from the other AND gates 73, 74, 76 and 77 indicate that corrections of the clock frequency are required. The digital to analog converter 79 generates the appropriate signal which is fed to the clock 72 to correct its output frequency.

I claim:

1. A system for transmitting data received at a first bit rate on a data link having a second bit rate higher than said first bit rate, said first and second bit rates not being synchronized, said system comprising a transmitter, said data link and a receiver, said transmitter including an input memory to receive and store input data at said first bit rate, a memory read out register sequentially to read out information stored in said memory at said second bit rate to said data link, means to inhibit operation of said first read out register for a number of bits equal to the difference between said first and second bit rates, said inhibiting means including a first shift register to generate a synchronization word, a second shift register to generate a deviation word and third shift register to generate a fill word, said deviation word being a constant number of bits and containing information about the number of bits in said fill word; said fill word being a variable number of bits, said synchronization word, deviation word and fill word being fed to said data link during the time read out of said memory read out register is inhibited, said memory contents being fed to said data link by said read out register after said fill word has been fed to said data link, said receiver including a memory to store data received from said date link at said second bit rate, means responsive to said synchronizing word and said deviation word inhibit read in of said synchronizing word, said deviation word and said fill word into said receiver memory, and receiver memory read out means to read out the contents of said receiver memory at said first bit rate.

2. A transmitter for a system for transmitting data received at a first bit rate on a data link having a second bit rate higher than said first bit rate, said transmitter including an input memory to receive and store input data at said first bit rate, a memory read out register sequentially to read out information from said memory at said second bit rate, means to inhibit operation of said readout register for a number of bits equal to the difference between said first and second bit rates, said inhibiting means including a first shift register to generate a synchronization code, a a second shift register to generate a deviation word, and a third shift register to generate a fill word, said deviation word being a constant number of bits containing information about the number of bits in said fill word; said fill word being a variable number of bits, said synchronization word, deviation word and fill word being fed to said data link during the time read out of said memory readout register is inhibited, said memory contents being fed to said data link by said readout register after said fill word has been fed to said data link.

3. A transmitter according to claim 2, wherein said input memory constitutes a first ring counter driven by a first clock slaved to the bit rate of the input data, said ring counter providing outputs to a plurality of AND gates to control the sequential storage of input data at said first bit rate on a plurality of storage capacitors, said memory readout register being driven by a master clock operating at said second bit rate, said memory readout register including a ring counter providing a plurality of outputs sequentially to operate a plurality of AND gates to readout data stored on said storage capacitors to said data link at the second bit rate, said transmitter including a pulse counter driven by said master clock and providing outputs which are coupled to gate circuits to control readout of said memory readout register, said means to inhibit operation of said readout register for a number of bits equal to the difference between said first and second bit rates including said pulse counter, a synchronization word generating register, a deviation word generating register, and a fill word generating register, said deviation word and fill word registers being coupled to outputs of said first ring counter and to an output of said pulse counter whereby said deviation word register generates a binary number indicative of the number of bits of said fill word, said fill word register transmitting pulses from said master clock to said data link to compensate for the difference in bit rates between said first bit rate and said second bit rate.

4. A receiver for a system for receiving and transmitting data at a first bit rate from a data link having a second bit rate higher than said first bit rate, said first and second bit rates not being synchronized, said receiver including a receiver memory to store data received from said data link at said second bit rate, means responsive to a synchronizing word, a deviation word and a fill word received on said data link to inhibit read-in of said synchronizing word, said deviation word and said fill word in said receiver memory, and receiver memory readout means to readout the contents of said receiver memory at said first bit rate, said receiver memory comprising a plurality of memory capacitors, data being fed from said data link to said memory capacitors via a plurality of AND gates controlled by a ring counter, and data being fed from said memory by said receiver memory readout means which comprises a second plurality of AND gates controlled by a second ring counter, said first ring counter being controlled by a slave clock whose frequency of operation is slaved to the input data rate to said receiver from said data link, said slave clock driving a pulse counter, said first ring counter, and said means responsive to the synchronizing word and deviation word for inhibiting read-in of the synchronization word, deviation word and fill word to said memory, said memory readout ring counter being controlled by a transmit clock, the frequency of which is maintained substantially at said first bit rate.

References Cited

UNITED STATES PATENTS

| | | | |
|---|---|---|---|
| 3,042,751 | 7/1962 | Graham | 179—15 |
| 3,136,861 | 6/1964 | Mayo | 179—15 |

ROBERT L. GRIFFIN, Primary Examiner

B. V. SAFOUREK, Assistant Examiner

U.S. Cl. X.R.

178—50; 179—15